United States Patent
Lee et al.

(10) Patent No.: US 12,484,908 B2
(45) Date of Patent: Dec. 2, 2025

(54) NON-CONTACT PRESSURE MEASUREMENT SYSTEM OF BALLOON CATHETER AND NONCONTACT PRESSURE MEASUREMENT METHOD OF BALLOON CATHETER, USING SAME

(71) Applicants: OSONG MEDICAL INNOVATION FOUNDATION, Cheongju-si (KR); KOREA UNIVERSITY RESEARCH AND BUSINESS FOUNDATION, Seoul (KR)

(72) Inventors: Kang Moo Lee, Sejong (KR); Eun Ju Yoo, Anyang-si (KR); Min Chul Song, Cheongju-si (KR); Chang Jun Choi, Sejong (KR); Jin Woo Ahn, Cheongju-si (KR); Geum Joon Cho, Seoul (KR)

(73) Assignee: OSONG MEDICAL INNOVATION FOUNDATION, KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 299 days.

(21) Appl. No.: 18/268,147

(22) PCT Filed: Nov. 1, 2021

(86) PCT No.: PCT/KR2021/015623
§ 371 (c)(1),
(2) Date: Jun. 16, 2023

(87) PCT Pub. No.: WO2022/139158
PCT Pub. Date: Jun. 30, 2022

(65) Prior Publication Data
US 2024/0050098 A1    Feb. 15, 2024

(30) Foreign Application Priority Data

Dec. 22, 2020    (KR) ........................ 10-2020-0180472

(51) Int. Cl.
*A61B 17/12*    (2006.01)
*A61B 17/42*    (2006.01)
*A61M 25/10*    (2013.01)

(52) U.S. Cl.
CPC .................. *A61B 17/12136* (2013.01); *A61B 2017/12004* (2013.01); *A61B 2017/4216* (2013.01);
(Continued)

(58) Field of Classification Search
None
See application file for complete search history.

(56) References Cited

U.S. PATENT DOCUMENTS 5,620,418 A * 4/1997 O'Neill ............. A61M 25/1002
604/103.08
2013/0222800 A1  8/2013 Ito et al.
(Continued)

FOREIGN PATENT DOCUMENTS

AU    2010352 A1    11/2012
EP    0853954 B1    2/2002
(Continued)

OTHER PUBLICATIONS

International search report issued on Feb. 11, 2022.
Japanese application office action issued on Jun. 11, 2024.
Extended European search report issued on Nov. 7, 2024.

*Primary Examiner* — Suman K Nath
(74) *Attorney, Agent, or Firm* — LEEPI (57) ABSTRACT

In a non-contact pressure measurement system of a balloon catheter and a non-contact pressure measurement method of the balloon catheter using the same, the system includes a (Continued)

chamber part, a balloon, a tube part, a pump part and a displacement sensor. The chamber part stores a saline solution. The balloon is disposed inside of a body and is configured to be expanded with supply of the saline solution. The tube part is configured to connect the chamber part with the balloon. The pump part is configured to control the supply of the saline solution via the tube part. The displacement sensor is configured to measure an amount of the expansion of the tube part expanded with the supply of the saline solution, in a predetermined section of the tube part.

12 Claims, 8 Drawing Sheets

(52) U.S. Cl.
CPC . *A61M 25/10181* (2013.11); *A61M 25/10184* (2013.11); *A61M 2205/3306* (2013.01); *A61M 2205/3327* (2013.01); *A61M 2205/3344* (2013.01); *A61M 2205/3393* (2013.01)

(56) References Cited

U.S. PATENT DOCUMENTS

| | | | |
|---|---|---|---|
| 2014/0155980 A1* | 6/2014 | Turjman | A61F 2/844 623/1.2 |
| 2016/0243290 A1* | 8/2016 | Vyas | A61L 31/14 |
| 2019/0262532 A1 | 8/2019 | Oh et al. | |

FOREIGN PATENT DOCUMENTS

| | | |
|---|---|---|
| JP | 2004531314 A | 10/2004 |
| JP | 2007525284 A | 9/2007 |
| JP | 2019511325 A | 4/2019 |
| KR | 20190049751 A | 5/2019 |
| KR | 20190111294 A | 10/2019 |
| KR | 20200134543 A | 12/2020 |
| WO | 2013024631 A1 | 2/2013 |

* cited by examiner

NON-CONTACT PRESSURE MEASUREMENT SYSTEM OF BALLOON CATHETER AND NONCONTACT PRESSURE MEASUREMENT METHOD OF BALLOON CATHETER, USING SAME

BACKGROUND OF THE INVENTION

Technical Field

Exemplary embodiments of the present invention relate to a non-contact pressure measurement system of a balloon catheter and a non-contact pressure measurement method of the balloon catheter using the same. More particularly, exemplary embodiments of the present invention relate to a non-contact pressure measurement system of a balloon catheter and a non-contact pressure measurement method of the balloon catheter using the same, capable of measuring the pressure and the amount of saline injection applied to uterine balloon tamponade or uterine balloon catheter among the methods of treating postpartum hemorrhage without contact.

Discussion of the Related Art

Postpartum hemorrhage is excessive bleeding within the first 24 hours after childbirth, and may be fatal if not properly treated. As methods for treating the postpartum hemorrhage, a hemostasis method using a uterine balloon tamponade or a uterine balloon catheter is mainly used.

Conventionally, in the hemostasis method using such a uterine balloon tamponade or a uterine balloon catheter, since the medical staff manually injects saline, it is difficult to inject saline solution quantitatively only as much as is actually needed by the patient. Further, it is also difficult to quantitatively measure the injection pressure of the saline solution currently being injected. Accordingly, as procedures have been performed that depend only on the experience of medical staff, problems such as injection of more pressure or amount than necessary or injection of too little pressure or amount have occurred.

As a device for treating such intrauterine bleeding, although prior arts such as Korean laid-open patent No. 10-2019-0111294 have been disclosed, it merely discloses a mechanical structure or design feature for treating bleeding, and a technique for measuring the amount or pressure of the injected saline solution in actual use of the catheter has not been developed.

In particular, in order to inject saline through a balloon catheter for the uterus, a tube drawn into the human body must be used. However, it is very limited to add a separate device or structure for measuring the injection amount or pressure on the tube in order to prevent infection in the human body through the saline solution.

As explained above, the related prior art is Korean laid-open patent No. 10-2019-0111294.

SUMMARY

Exemplary embodiments of the present invention provide a non-contact pressure measurement system of a balloon catheter, capable of measuring the pressure and the amount of saline injection applied to uterine balloon tamponade or uterine balloon catheter among the methods of treating postpartum hemorrhage without contact, so as assist the procedure effectively by enabling accurate measurement while preventing contamination or infection.

Exemplary embodiments of the present invention also provide a non-contact pressure measurement method of the balloon catheter using the non-contact pressure measurement system of a balloon catheter.

According to one aspect of the present invention, the system includes a chamber part, a balloon, a tube part, a pump part and a displacement sensor. The chamber part stores a saline solution. The balloon is disposed inside of a body and is configured to be expanded with supply of the saline solution. The tube part is configured to connect the chamber part with the balloon. The pump part is configured to control the supply of the saline solution via the tube part. The displacement sensor is configured to measure an amount of the expansion of the tube part expanded with the supply of the saline solution, in a predetermined section of the tube part.

In an exemplary embodiment, the chamber part may include a weight sensor disposed under the chamber part, and configured to measure a weight of the saline solution stored in the chamber part.

In an exemplary embodiment, the pump part may provide the saline solution with a pulse through the tube part, without contacting the saline solution.

In an exemplary embodiment, the system may further include an injection amount measuring part configured to measure an amount of the saline solution injected to the balloon through the tube part, based on the weight of the saline solution measured by the weight sensor and the pulse information operated in the pump part.

In an exemplary embodiment, the displacement sensor may include a first fixing part configured to fix a first end of the tube part within a predetermined section, a second fixing part configured to fix a second end of the tub part within the predetermined section, and a sensor unit configured to measure the amount of the expansion of the tube part with the supply of the saline solution between the first and second fixing parts.

In an exemplary embodiment, the sensor unit may be a displacement sensor configured to measure the amount of the expansion of the tube part using a laser.

In an exemplary embodiment, the sensor unit may include a light emitting part disposed at a first side of the tube part and configured to irradiate the laser, and a light receiving part disposed at a second side of the tube part and configured to receiving the laser.

In an exemplary embodiment, the displacement sensor may include a base plate at which the first and second fixing parts spaced apart from each other are fixed, a first connector connected to a first end of the tube part and fixed at the first fixing part, and a second connector connected to a second end of the tube part and fixed at the second fixing part.

In an exemplary embodiment, the distance between the first and second fixing parts may be changed in the base plate, and a plurality of fixing grooves may be formed at the base plate for the first and second fixing parts to be fixed at different spacing intervals.

In an exemplary embodiment, the distance between the first and second fixing parts may be changed in the base plate. The sensor array may be configured to measure the amount of the expansion of the tube part at a plurality of positions of the tube parts.

In an exemplary embodiment, the system may further include a database in which a relationship between a pressure applied to the tube part and the expansion of the tube part, for the types of the tube part, and a pressure measuring part configured to measure the pressure applied to the tube part, based on the information stored in the database and the amount of the expansion of the tube part measured by the displacement sensor.

According to another aspect of the present invention, the method includes pre-storing a relationship between a pressure applied to a tube part and an amount of expansion of the tube part, for the types of the tube part, injecting a saline solution stored in a chamber part into the tube part and providing the saline solution to a balloon, measuring an amount of the saline solution injected to the tube part, measuring the amount of the expansion of the tube part with supply of the saline solution, in a predetermined section of the tube part, and measuring the pressure applied to the tube part, based on the pre-stored information and the amount of the expansion of the tube part.

In an exemplary embodiment, when an emergency situation occurs in injecting the saline solution to the tube part, the entire saline solution supplied to the balloon may be drained into the chamber part, and the injection of the saline solution into the tube part may be stopped.

According to exemplary embodiments of the present invention, it is possible to measure the pressure or supply amount of saline solution supplied to the balloon located in the body through a non-contact system without direct contact with the saline solution or the tube, so that a procedure based on the experience or subjective judgment of conventional medical staff may be avoided and an objective procedure based on more accurate measurement results may be performed, with preventing problems such infection.

The amount of saline solution supplied may be accurately measured without contact, based on pulse information of a weight sensor part configured to a chamber part and pump part supplying the saline solution with a pulse. In addition, the pressure applied to the tube part by the saline solution may be accurately measured by measuring the degree of expansion of the tube part through the displacement sensor.

Here, since the pressure may be derived using the relationship between the pre-stored level of expansion of the tube part and the pressure, as for the expansion level of the tube part measured by the displacement sensor, the pressure at which the saline solution is supplied may be accurately derived even for various types of tubes or various saline supply environments.

In order to measure the degree of expansion of the tube part through the displacement sensor, in a predetermined section on the tube part, fixing is performed through a pair of fixing parts so as to expand the tube part, and the expansion displacement of the tube part is directly measured using a laser. Thus, it is possible to measure the degree of expansion relatively accurately.

Here, by varying the length of a predetermined section on the tube part or applying a sensor array in which a plurality of sensor units are aligned within the predetermined section, the degree of expansion of the tube part may be accurately measured according to various environmental variables such as the type of the tube part, the type of saline solution, or the pressure or amount of the saline solution applied thereto.

REFERENCE NUMERALS

1: non-contact pressure measurement system
50: tube part
100: chamber part
110: weight sensor
200: pump part
300: injection amount measuring part
400: displacement sensor
410: base plate
420: sensor unit
425, 426: sensor array
430, 440: fixing part
450, 460: connector
500: pressure measuring part
600: balloon
700: controller
800: database

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
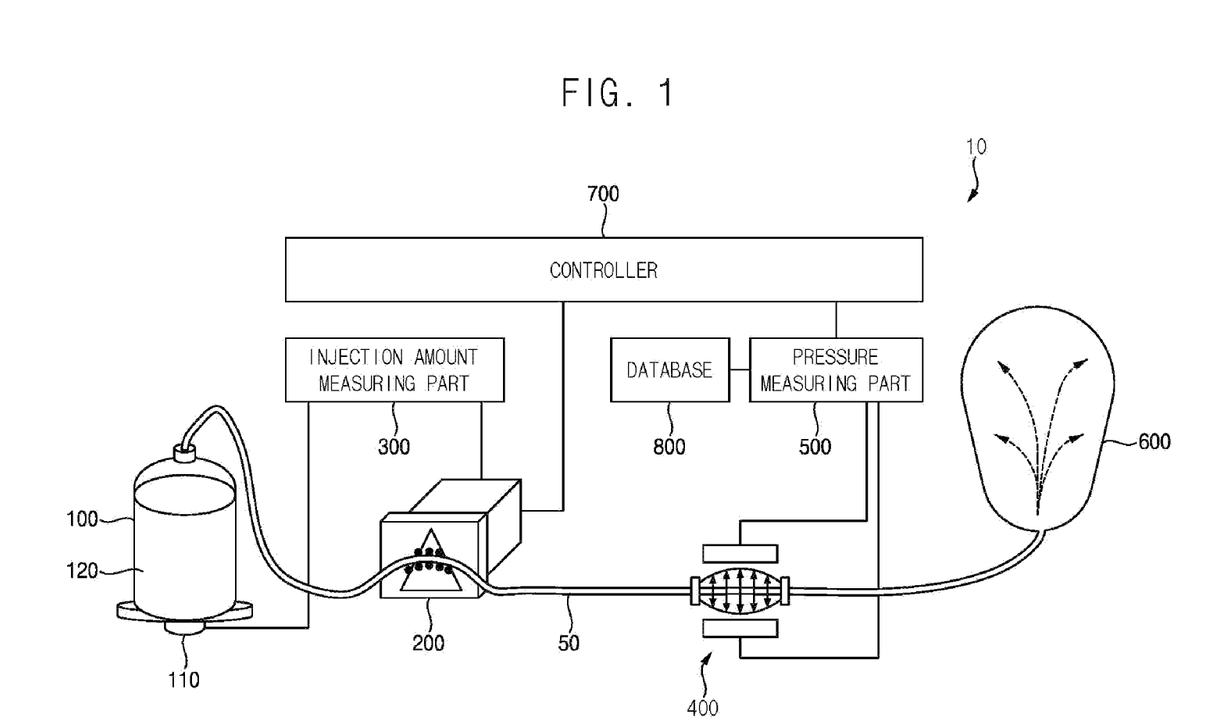
FIG. 1 is a schematic diagram illustrating a non-contact pressure measurement system according to an example embodiment of the present invention.

FIG. 1 is a schematic diagram illustrating a non-contact pressure measurement system according to an example embodiment of the present invention.

Referring to FIG. 1, the non-contact pressure measurement system 10 (hereinafter, the system) according to the present example embodiment includes a chamber part 100, a pump part 200, an injection amount measuring part 300, a displacement sensor 400, a pressure measuring part 500, a balloon 600, a controller 700, a database 800 and a tube part 50.

The chamber part 100 is a chamber forming a predetermined space thereinside, and a saline solution 120 is stored in the space of the chamber part 100. The saline solution 120 passes through the tube part 50 and is provided to the balloon 600, and types of the saline solution are not limited.

The balloon 600 is disposed inside of a body, for example a womb, and is expanded by the saline solution 120 supplied into the balloon 600. Accordingly, as the balloon is expanded, hemostasis may be performed on the part where postpartum bleeding occurs, and it may serve as a so-called uterine balloon tamponade or a uterine balloon catheter.

In the present example embodiment, an amount of the saline solution 120 and a pressure of the saline solution 120 provided into the balloon 600 are measured. In addition, objective information on the amount and the pressure of the saline solution 120 is provided, and thus the amount and the pressure of the saline solution 120 for stopping postpartum hemorrhage may be controlled and be uniformly maintained.

The tube part 50 is extended from the chamber part 100 to the balloon 600, and a portion disposed adjacent to the balloon 600 and inserted into the body should be controlled not to be polluted for preventing the infection.

Here, a material or a length of the tube part 50 may be changed variously and not to limited to a specific condition. In the present example embodiment, even though the material of the tube part 50 is changed, the amount and the pressure of the saline solution 120 may be accurately measured using the system 10 as mentioned below, and thus the system 10 may be applied to various kinds of tube parts.

The weight sensor 110 is disposed under the chamber part 100. The weight sensor 110 may be configured to measure the weight of the chamber part 100 and the saline solution 120. Thus, the weight of the saline solution 120, that is, the weight of the saline solution 120 provided via the tube part 50 may be obtained.

Here, the information of the weight of the saline solution 120 obtained by the weight sensor 110 may be provided to the injection amount measuring part 300.

The pump part 200 pumps the saline solution 120, so as for the saline solution 120 to flow into the tube party 50.

Here, the pump part 200 may be operated by an operation control signal of the controller 700, and the pump part 200 may supply the saline solution 120 toward the balloon 600 based on the control of the controller 700. Alternatively, the pump part 200 may drain the saline solution 120 filled in the balloon 60 into the chamber part 100.

The pump part 120 pumps the saline solution 120 without contacting the saline solution 120. For example, the pump part 120 may be operated with a pulse driving, and then the saline solution 120 may be supplied to the tube part 50 in a predetermined uniform amount.

The information on the pulse driving of the pump part 120 is provided to the injection amount measuring part 300.

The injection amount measuring part 300 measures the amount of the saline solution 120 provided via the tube part 50, based on the information of the weight of the saline solution 120 measured by the weight sensor 110, and the information of the pulse in the pulse driving of the pump part 200.

Based on the change of the weight of the saline solution 120, the amount of the saline solution 120 supplied to the tube part 50 may be obtained. In addition, since the amount of the saline solution 120 provided in a single pulse at the pump part 200 is pre-known information, the amount of the saline solution 120 supplied to the tube part 50 may be obtained based on the number of the pulse.

Thus, the injection amount measuring part 300 may obtain the amount of the saline solution 120 supplied to the tube part 50 accurately, based on the information on the weight change and the pulse.

The information on the amount of the saline solution 120 obtained as explained above is provided to the controller 700, and the controller 700 decides whether the amount and the pressure of the saline solution 120 is within a normal amount and a normal pressure respectively, with the information of the pressure of the saline solution 120. Then, the controller 700 controls the operation of the pump part 120.

The displacement sensor 400 measures the pressure of the saline solution 120 passing through the tube part 50. The tube part 50 is designed to be expanded according as the saline solution 120 passes through the tube part 50 in a predetermined section, and then the displacement sensor 400 measures the amount of the expansion of the tube part 50. Thus, the displacement sensor 400 may measure the pressure of the saline solution 120.

Here, the detailed explanation on the displacement sensor 400 is followed below.

The pressure measuring part 500 measures the pressure of the saline 120 applied to the tube part 50, based on the information of the expansion of the tube part 50 measured in the displacement sensor 400.

The displacement sensor 400 merely provides the information of the amount of the expansion of the tube part 50 to the pressure measuring part 500. Thus, the pressure measuring part 500 uses the information stored in the database 800, to obtain the pressure applied to the tube part 50, that is, the pressure information of the saline solution 120.

A relationship between the expansion of the tube part and the pressure of the saline solution is pre-stored in the database 800. Here, the relationship on various kinds of tube parts may be pre-stored in the database 800.

For the same environment (simulated environment) as the system 10 of FIG. 1, the saline solution is supplied to various kinds of tube parts, the pressure is measured using a separate pressure sensor, and the amount of the expansion of the tube parts at the corresponding pressure is measured and is stored in the database 800.

Accordingly, the amount of the expansion of the tub parts and the pressure information in every case are stored from the simulation environment, and thus the saline solution 120 may be prevented from being infected by outer elements, for example the pressure sensor and so on, in the actual procedure of the operation. In addition, the pressure information may be easily obtained only by the expansion information of the tube part 50 which may be obtained without direct contact with the saline solution 120.

The pressure information of the saline solution 120 measured in the pressure measuring part 500 is provided to the controller 700. The controller 700 decides whether the pressure is within a range of the normal pressure or not, and when the measured pressure is out of the normal pressure, the controller 700 may stop the operation of the pump part 200.

Figure 2A:
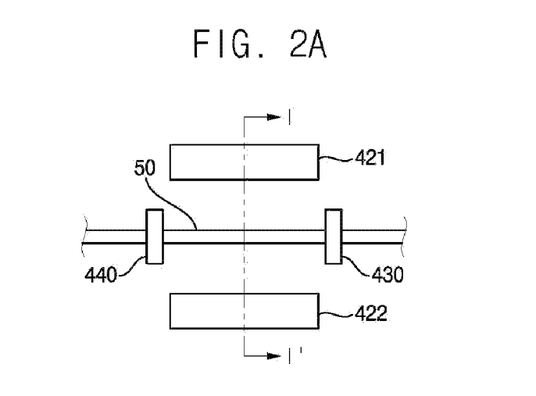
FIG. 2A, FIG. 2B and FIG. 2C are plan views illustrating a sensing state of a displacement sensor of FIG. 1, and FIG. 3A, FIG. 3B and FIG. 3C are cross-sectional views taken along a line I-I' of FIG. 2A in the sensing state of the displacement sensor.
Figure 2B:
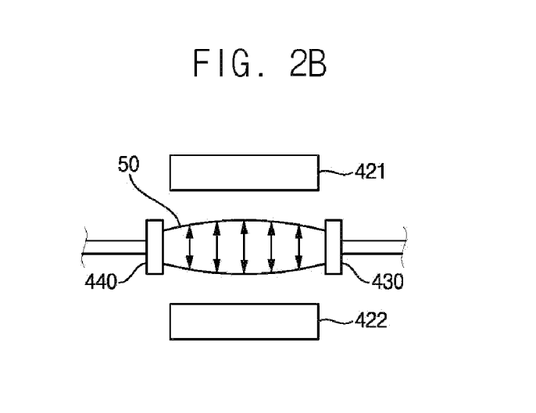
Figure 2C:
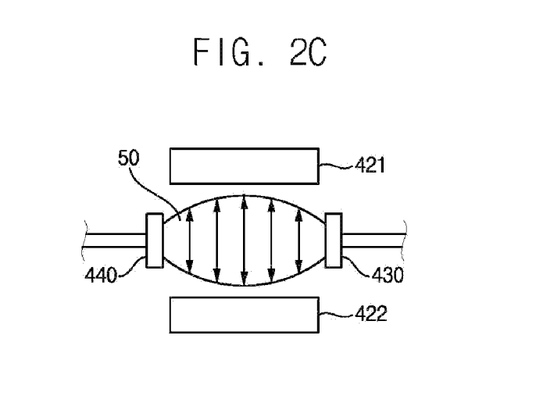

FIG. 2A, FIG. 2B and FIG. 2C are plan views illustrating a sensing state of a displacement sensor of FIG. 1, and FIG. 3A, FIG. 3B and FIG. 3C are cross-sectional views taken along a line I-I' of FIG. 2A in the sensing state of the displacement sensor.

Figure 3A:
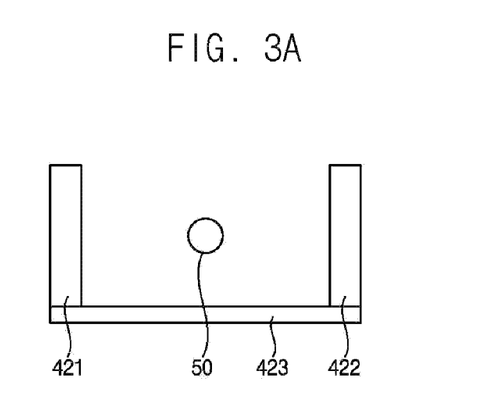

Referring to FIG. 2A and FIG. 3A, the displacement sensor 400 includes a sensor unit 420, a first fixing part 430 and a second fixing part 440. The sensor unit 420 includes a light emitting part 421, a light receiving part 422 and a base frame 423.

For a predetermined section of the tube part 50, a first end of the tube part 50 is fixed by the first fixing part 430, and a second end of the tube part 50 is fixed by the second fixing part 440, and then the displacement of the tube part 50 expanded according to the passing of the saline solution 120 is measured by the sensor unit 420.

Here, FIG. 2A and FIG. 3A show the state of the saline solution 120 not passing through the tube part 50, and the displacement of the tube part 50 measured by the sensor unit 420 is an initial state or an initial value.

Figure 3B:
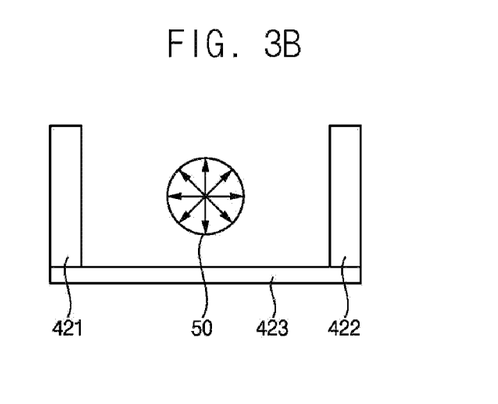

Then, referring to FIG. 2B and FIG. 3B, as the saline solution 120 passes through the tube part 50, the tube part 50 is expanded at the predetermined section between the first and second fixing parts 430 and 440, and then the sensor unit 420 measures the amount of the expansion of the tube part 50.

Figure 3C:
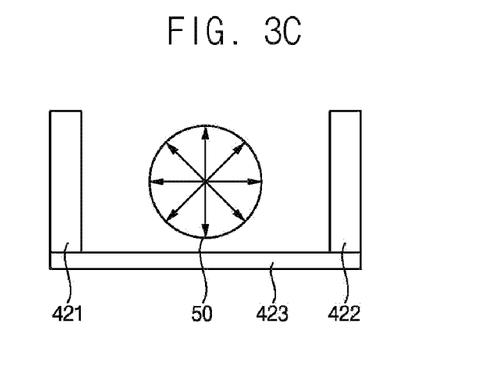

Further, referring to FIG. 2C and FIG. 3C, as the amount of the saline solution 120 passing through the tube part 50, the amount of the expansion of the tube part 50 at the predetermined section is increased, and the sensor unit 420 measures the amount of the expansion of the tube part 50.

Then, as the saline solution 120 is supplied, the information of the amount of the expansion of the tube part 50 is obtained by the sensor unit 420 in a real time, and the obtained information is provided to the pressure measuring part 500.

Figure 4A:
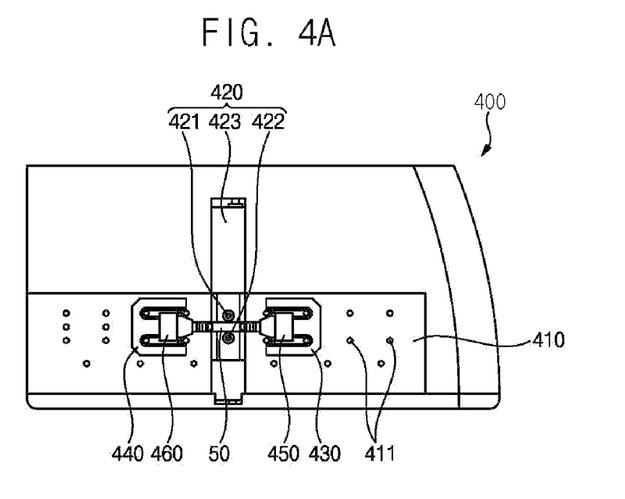
FIG. 4A is a plan view illustrating the displacement sensor of FIG. 1, and FIG. 4B and FIG. 4C are plan views illustrating examples of extending the length of the tube part.
Figure 4B:
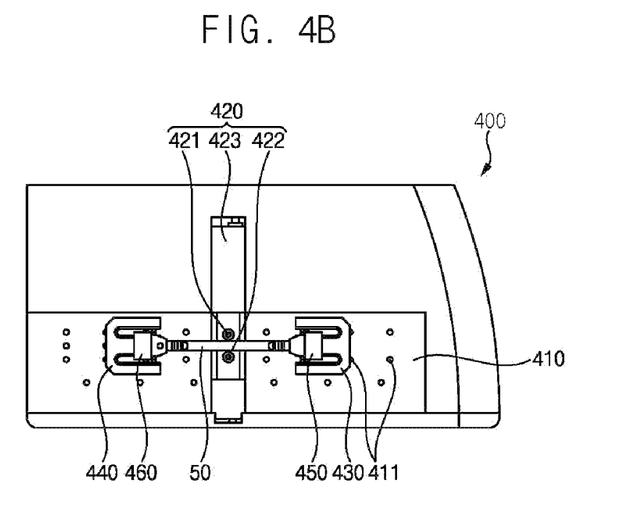
Figure 4C:
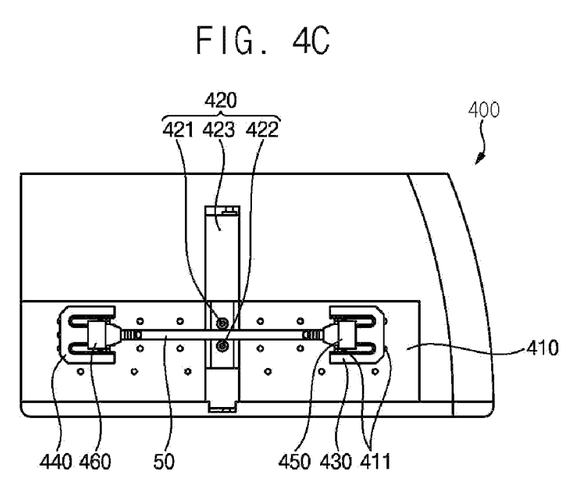

FIG. 4A is a plan view illustrating the displacement sensor of FIG. 1, and FIG. 4B and FIG. 4C are plan views illustrating examples of extending the length of the tube part.

First, referring to FIG. 4A, the displacement sensor 400 further includes a base plate 410, a first connector 450 and a second connector 460.

The base plate 410 is a plate extending with a predetermined area, and the first and second fixing parts 430 and 440 and the sensor unit 420 explained above are disposed on the base plate 410.

A plurality of fixing grooves 411 is formed at the base plate 410 by a predetermined distance, and the first and second fixing parts 430 and 440 adjacent to each other are fixed at the fixing grooves 411 through a fixing unit (not shown).

As illustrated in FIG. 4B and FIG. 4C, the distance between the first and second fixing parts 430 and 440 may be changed variously. As the distance between the first and second fixing parts 430 and 440 changes, a length of the tube part 50 extending between the first and second fixing parts 430 and 440 is also changed.

When the tube part 50 is relatively flexible and the amount of the expansion of the tube part 500 is relatively larger, the amount of the expansion of the tube part 50 is increased and then the amount of the expansion of the tube part 50 is hard to be measured by the sensor unit 420, in case that the length of the tube part 50 fixed by the first and second fixing parts 430 and 440 is relatively shorter.

However, when the tube part 50 is relatively rigid and the amount of the expansion of the tube part 500 is relatively smaller, the amount of the expansion of the tube part 50 is decreased and then the amount of the expansion of the tube part 50 is hard to be measured by the sensor unit 420, in case that the length of the tube part 50 fixed by the first and second fixing parts 430 and 440 is relatively longer.

Thus, as illustrated in FIG. 4A, FIG. 4B and FIG. 4C, the distance between the first and second fixing parts 430 and 440 may be controlled variously considering the material of the tube part 50, that is, the amount of the expansion of the tube part 50, the kinds of the saline solution 120 passing through the tube part 50, and so on.

The sensor unit 420, as explained above, measures the amount of the expansion of the tube part 50, that is, the displacement of the expansion, and for example, the sensor unit 420 may be a displacement sensor measuring the displacement using a laser.

Here, the base frame 423 may fixed at the base frame 423, in a direction crossing an extending direction of the tube part 50.

In addition, the light emitting part 421 is disposed at a first side of the tube part 50 and irradiates a laser. The light receiving part 422 is disposed at a second side of the tube part 50 and receives the laser which is irradiated from the light emitting part 421, passes through the tube part 50 and then reaches at the light receiving part 422. The tube part 50 is extended between the light emitting part 421 and the light receiving part 422.

Then, the light receiving part 422 measures the amount of the expansion of the tube part 50, based on the laser irradiated from the light emitting part 420 and reaching at the light receiving part 422 with shielded by the tube part 50.

Further, the first and second connectors 450 and 460 may be explained below.

Figure 5A:
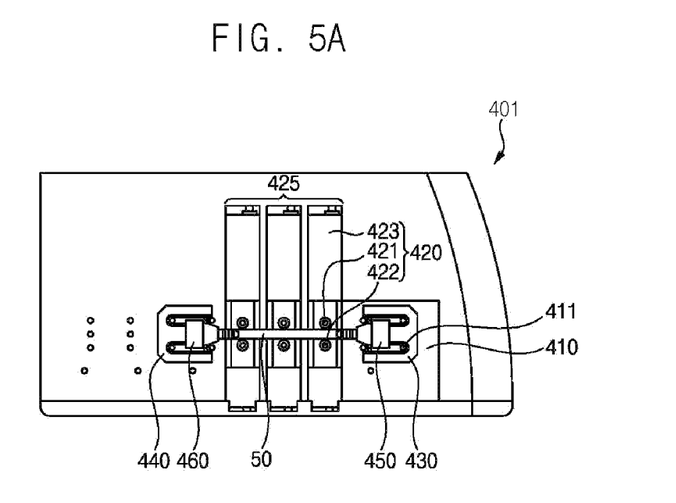
FIG. 5A and FIG. 5B are plan views illustrating another examples of the displacement sensor of FIG. 1.
Figure 5B:
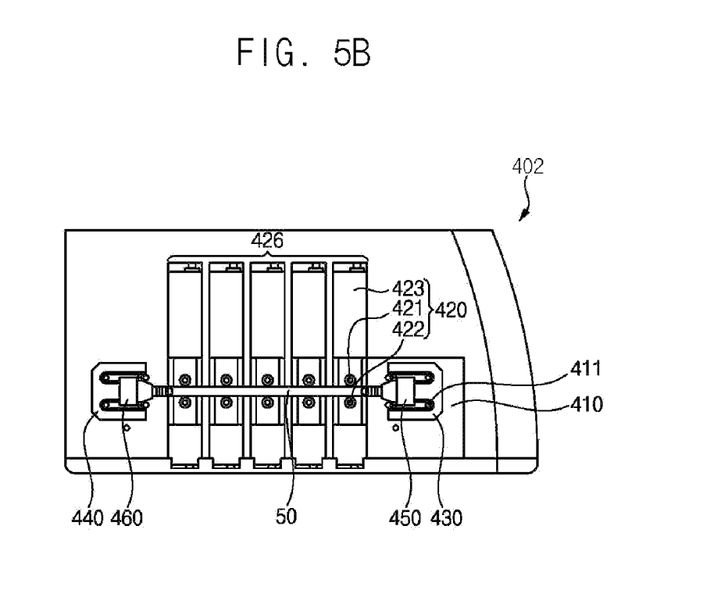

FIG. 5A and FIG. 5B are plan views illustrating another examples of the displacement sensor of FIG. 1.

In the displacement sensor 401 illustrated in FIG. 5A, as the distance between the first and second fixing parts 430 and 440 increases, three sensor units 420 are arranged in parallel between the first and second fixing parts 430 and 440, to form a sensor array 425.

Here, the sensor units 420 each having the same structure are arranged in parallel with the same distance along a direction perpendicular to the extending direction of the tube part 50.

Likewise, in the displacement sensor 402 illustrated in FIG. 5B, as the distance between the first and second fixing parts 430 and 440 increases, five sensor units 420 are arranged in parallel between the first and second fixing parts 430 and 440, to form a sensor array 426.

Here, as explained referring to FIG. 5A, the sensor units 420 each having the same structure are arranged in parallel with the same distance along a direction perpendicular to the extending direction of the tube part 50.

Accordingly, a plurality of sensor units is arranged between the first and second fixing parts 430 and 440 and then forms the sensor array 425 and 426, and thus the amount of the expansion of the tube part 50 may be measured at various positions of the tube part 50 extending between the first and second fixing parts 430 and 440.

Then, based on the information of the amount of the expansion of the tube part 50 at various positions, the amount of the expansion of the tube part 50 may be accurately obtained even though the length of the measures length of the tube part 50 increases.

Figure 6:
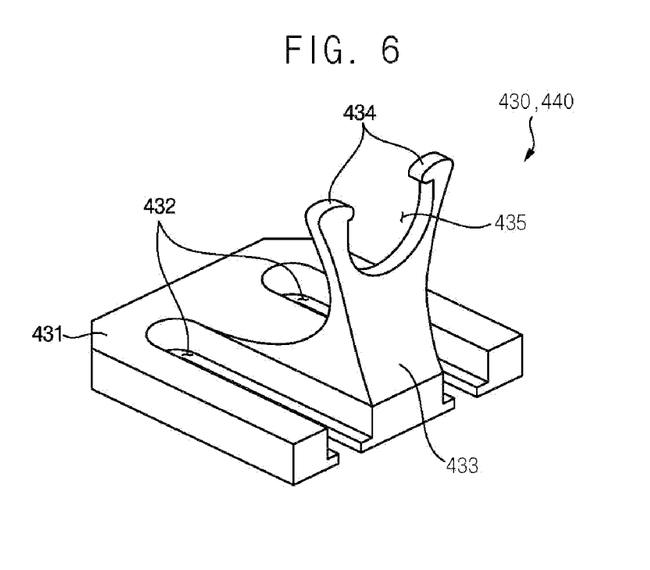
FIG. 6 is a perspective view illustrating the first and second fixing parts of FIG. 4A.
Figure 7:
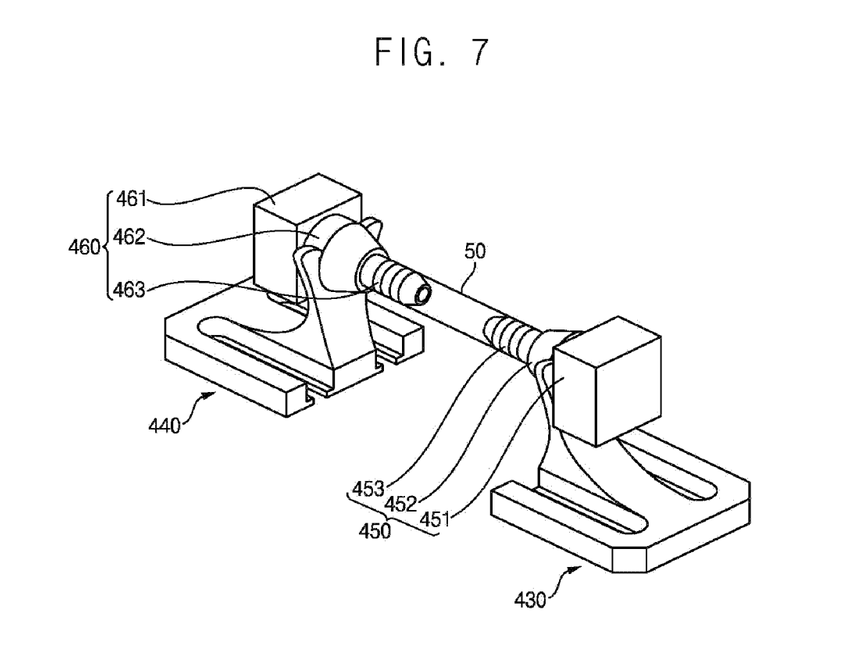
FIG. 7 is a perspective view illustrating a fixing state of the first and second connectors and the tube part fixed to the first and second fixing parts.

FIG. 6 is a perspective view illustrating the first and second fixing parts of FIG. 4A. FIG. 7 is a perspective view illustrating a fixing state of the first and second connectors and the tube part fixed to the first and second fixing parts.

Referring to FIG. 6, the first and second fixing parts 430 and 440 are disposed to face each other and each has the same structure, and then the first fixing part 430 is explained.

The first fixing part 430 includes a base part 431, an extending part 433 and a clamping part 434.

The base part 431 forms a base of the first fixing part 430, and is disposed on the base plate 410. Here, a pair of the fixing line grooves 432 is formed at the base part 431, and the fixing line grooves 432 are aligned with the fixing grooves 411 at the base plate 410, and thus the first fixing part 430 may be fixed at the base plate 410 through an additional fixing unit (not shown).

The extending part 433 extends between the pair of the fixing line grooves 432 at an end of the base part 431, and the extending part 433 extends with a predetermined height.

The clamping part 434 is formed at an end of the extending part 433, and is protruded with a fixing protrusion. An inserting portion 435 is formed at a space between the pair of end portions of the clamping part 434.

At the inserting portion 435, the first connector 450 is inserted and fixed, and then the tube part 50 may be fixed via the first and second connectors 450 and 460.

Here, the extending part 433 is extended with a predetermined height, and then the tube part 50 fixed between the first and second connectors 450 and 460 is also extended upward by a predetermined height from the base plate 410.

The clamping part 434 has the pair of end portions and forms the inserting portion 435, and thus the first connector 450 positioned at the inserting portion 435 may be stably fixed.

As illustrated in FIG. 7, the first connector 450 is fixed at the inserting portion 435 of the first fixing part 430, and the second connector 460 is fixed at an inserting portion of the second fixing part 440.

Here, the first connector 450 includes a body portion 451, a supporting portion 452, and a connecting portion 453. The supporting portion 452 is extended from the body portion 451 and is fixed at the inserting portion 435 of the first fixing part 430. The connecting portion 435 is extended from the supporting portion 452 and is connected to the tube part 50.

Likewise, the second connector 460 includes a body portion 461, a supporting portion 462, and a connecting portion 463, like the first connector 450.

Thus, at the predetermined section, a first end of the tube part 50 is fixed at the first fixing part 430 by the first connector 450, and a second end of the tube part 50 is fixed at the second fixing part 440 by the second connector 460.

Then, the sensor unit 420 measures the amount of the expansion of the tube part 50 at the predetermined section of the tube part 50.

In FIG. 7, the tube part 50 is exampled to be disposed between the first and second fixing parts 430 and 440, but the tube part 50 may be extended to pass through the body portions 451 and 461 of the first and second connectors 450 and 460, as expected referring to FIG. 1.

Accordingly, the displacement sensor 400 is positioned at the predetermined section of the tube part 50, so that the amount of the expansion of the tube part 50 at the section may be measured, and then the pressure information of the saline solution 120 passing through the tube part 50 may be obtained.

Here, the pressure is obtained without the contact, that is, the non-contact type is applied in measuring the saline solution 120, so that the pollution or the infection of the saline solution may be minimized.

Figure 8:
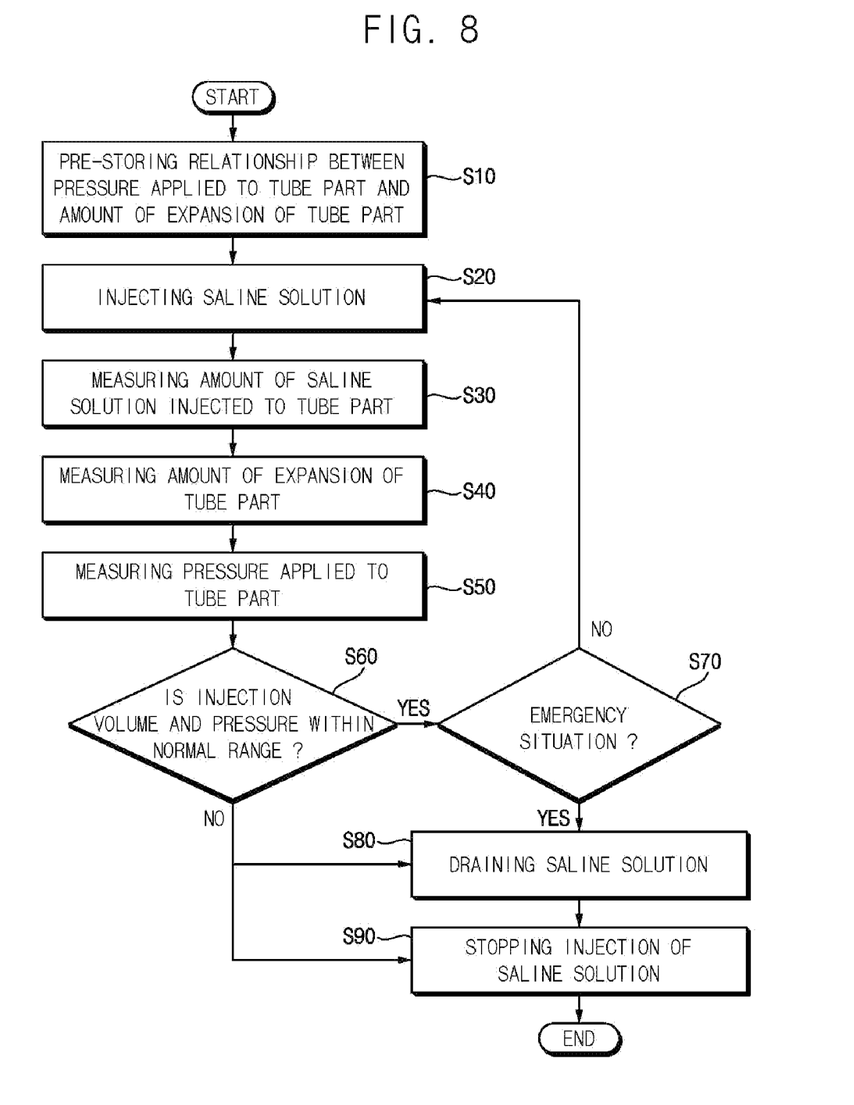
FIG. 8 is a flow chart showing a non-contact pressure measurement method using the non-contact pressure measurement system of FIG. 1.

FIG. 8 is a flow chart showing a non-contact pressure measurement method using the non-contact pressure measurement system of FIG. 1.

Referring to FIG. 8, in the method using the system 10, the relationship between the pressure applied to the tube part and the amount of the expansion of the tube part for various kinds of tube parts, is pre-stored in the database (step S10).

As explained above, it may be performed in the simulated environment simulated by the same system as the non-contact pressure measurement system 10 of FIG. 1.

Then, the saline solution 120 stored in the chamber part 100 is injected to the tube part 50, and then is supplied to the balloon 600 (step S20).

Here, using the weight sensor 110 in the chamber part 100, the information of the weight of the saline solution 120 stored in the chamber part 100, that is the change of the weight of the saline solution 120 according to the supply of the saline solution 120, is measured, and then the measured information is provided to the injection amount measuring part 300.

In addition, when the pump part 200 supplies the saline solution 120 to the tube part 50, the information of the supplying pulse of the pump part 200 is also provided to the injection amount measuring part 300.

Then, the injection amount measuring part 300 measures the amount of the saline solution 120 supplied into the tube part 50, based on the information of the weight (change) of the saline solution 120 measured by the weight sensor 110, and the information of the pulse of the pump part 200.

The information of the amount of the saline solution 120 is provided to the controller 700.

Then, the displacement sensor 400 in the tube part 50 measures the amount of the expansion of the tube part 50 (step S40).

Here, the detailed measuring method of the displacement sensor 400 is explained above.

The information of the amount of the expansion of the tube part 50 is provided to the pressure measuring part 500, and the pressure measuring part 500 obtains the pressure applied to the tube part 50, based on the relationship between the pressure applied to the tube part and the amount of the expansion of the tube part which is pre-stored in the database 800.

In addition, the obtained pressure information of the tube part 50 is provided to the controller 700.

Then, the controller 700 decides whether the amount and the pressure of the saline solution 120 supplied to the tube part 50 are within the ranges of the normal injection amount and the normal pressure respectively, based on the measured pressure information and the measured amount information of the saline solution 120 (step S60).

Thus, if the amount and the pressure of the saline solution 120 is out of the normal ranges (step S60), the controller 700 controls the operation of the pump part 200 to stop supplying the saline solution 120 into the tub part 50 (step S90).

Here, in case of stopping additional supply of the saline solution, when the injection amount and the pressure are still out of the normal ranges, the saline solution 120 supplied to the balloon 600 is drained into the chamber part 100 (step S80). Thus, the controller 700 may control the operation of the pump part 200 reversely, and then the draining may be performed.

In addition, even though the injection amount and the pressure are within the normal ranges (step S60), when an emergency situation occurs (step S70), the controller 700 performs an emergency operation (step S80 and step S90).

Here, the emergency situation may be a situation in which an external command to stop the operation is input from a medical staff or operator, or a patient is in an emergency situation.

When the emergency situation occurs, the controller 700 controls the operation of the pump part 200, to drain the saline solution 120 supplied to the balloon 600 into the chamber part 100 (step S80). In addition, the controller 700 controls the operation of the pump part 200, to stop supplying the saline solution 120 (step S90).

According to the present embodiment, it is possible to measure the pressure or supply amount of saline solution supplied to the balloon located in the body through a non-contact system without direct contact with the saline solution or the tube, so that a procedure based on the experience or subjective judgment of conventional medical staff may be avoided and an objective procedure based on more accurate measurement results may be performed, with preventing problems such infection.

The amount of saline solution supplied may be accurately measured without contact, based on pulse information of a weight sensor part configured to a chamber part and pump part supplying the saline solution with a pulse. In addition, the pressure applied to the tube part by the saline solution may be accurately measured by measuring the degree of expansion of the tube part through the displacement sensor.

Here, since the pressure may be derived using the relationship between the pre-stored level of expansion of the tube part and the pressure, as for the expansion level of the tube part measured by the displacement sensor, the pressure at which the saline solution is supplied may be accurately derived even for various types of tubes or various saline supply environments.

In order to measure the degree of expansion of the tube part through the displacement sensor, in a predetermined section on the tube part, fixing is performed through a pair of fixing parts so as to expand the tube part, and the expansion displacement of the tube part is directly measured using a laser. Thus, it is possible to measure the degree of expansion relatively accurately.

Here, by varying the length of a predetermined section on the tube part or applying a sensor array in which a plurality of sensor units are aligned within the predetermined section, the degree of expansion of the tube part may be accurately measured according to various environmental variables such as the type of the tube part, the type of saline solution, or the pressure or amount of the saline solution applied thereto.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A non-contact pressure measurement system comprising:
    a chamber part storing a saline solution;
    a balloon disposed inside of a body and configured to be expanded with supply of the saline solution;
    a tube part configured to connect the chamber part with the balloon;
    a pump part configured to control the supply of the saline solution via the tube part; and
    a displacement sensor configured to measure an amount of the expansion of the tube part expanded with the supply of the saline solution, in a predetermined section of the tube part;
    a database in which a relationship between a pressure applied to the tube part and the expansion of the tube part, for the types of the tube part; and
    a pressure measuring part configured to measure the pressure applied to the tube part, based on the information stored in the database and the amount of the expansion of the tube part measured by the displacement sensor.

2. The system of claim 1, wherein the chamber part comprising:
    a weight sensor disposed under the chamber part, and configured to measure a weight of the saline solution stored in the chamber part.

3. The system of claim 1, wherein the pump part provides the saline solution with a pulse through the tube part, without contacting the saline solution.

4. The system of claim 3, further comprising:
    an injection amount measuring part configured to measure an amount of the saline solution injected to the balloon through the tube part, based on the weight of the saline solution measured by the weight sensor and the pulse information operated in the pump part.

5. The system of claim 1, wherein the displacement sensor comprises:
    a first fixing part configured to fix a first end of the tube part within a predetermined section;
    a second fixing part configured to fix a second end of the tub part within the predetermined section; and
    a sensor unit configured to measure the amount of the expansion of the tube part with the supply of the saline solution between the first and second fixing parts.

6. The system of claim 5, wherein the sensor unit is a displacement sensor configured to measure the amount of the expansion of the tube part using a laser.

7. The system of claim 6, wherein the sensor unit comprises:
    a light emitting part disposed at a first side of the tube part and configured to irradiate the laser; and
    a light receiving part disposed at a second side of the tube part and configured to receiving the laser.

8. The system of claim 5, wherein the displacement sensor comprises:
    a base plate at which the first and second fixing parts spaced apart from each other are fixed;
    a first connector connected to a first end of the tube part and fixed at the first fixing part; and
    a second connector connected to a second end of the tube part and fixed at the second fixing part.

9. The system of claim 8, wherein the distance between the first and second fixing parts is changed in the base plate,
    wherein a plurality of fixing grooves is formed at the base plate for the first and second fixing parts to be fixed at different spacing intervals.

10. The system of claim 5, wherein the sensor unit is arranged in a plural within the predetermined section of the tube part, to be formed as a sensor array,
    wherein the sensor array is configured to measure the amount of the expansion of the tube part at a plurality of positions of the tube parts.

11. A non-contact pressure measurement method comprising:

pre-storing a relationship between a pressure applied to a tube part and an amount of expansion of the tube part, for the types of the tube part;

injecting a saline solution stored in a chamber part into the tube part and providing the saline solution to a balloon;

measuring an amount of the saline solution injected to the tube part;

measuring the amount of the expansion of the tube part with supply of the saline solution, in a predetermined section of the tube part; and measuring the pressure applied to the tube part, based on the pre-stored information and the amount of the expansion of the tube part.

12. The method of claim 11, wherein when an emergency situation occurs in injecting the saline solution to the tube part, draining the entire saline solution supplied to the balloon into the chamber part; and stopping the injection of the saline solution into the tube part.

* * * * *